Figure 1:
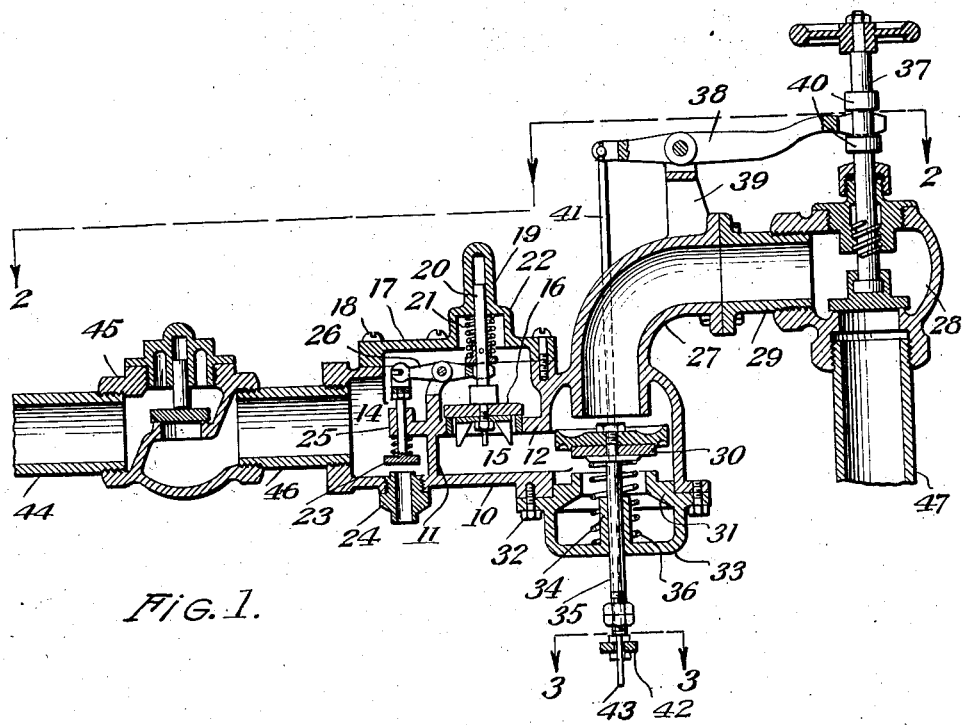

May 22, 1934.        O. K. ENTRIKEN        1,960,144
SERVICE VALVE
Filed Aug. 4, 1933

ORIEN K. ENTRIKEN
INVENTOR.

BY
*Victor J. Evans & Co.* ATTORNEYS.

Patented May 22, 1934

1,960,144

UNITED STATES PATENT OFFICE 1,960,144

SERVICE VALVE

Orien K. Entriken, Los Angeles, Calif.

Application August 4, 1933, Serial No. 683,702

4 Claims. (Cl. 277—1)

The object of the invention is to provide a valve construction for inclusion between the public water main and separate service systems, so that there can be no contamination of the public supply from any particular service line; to provide a service valve which, in the event of a reduction in the pressure in the water main, will automatically function to prevent any feed-back into the latter from the separate service lines; to provide a service valve which, when closed, to cut off connection between the service lines and the water main, will automatically function to drain its several chambers; and generally to provide a device of the kind indicated which, for the functions carried out, is of comparatively simple form, susceptible of cheap manufacture and of a character to permit disassembling for cleaning or repair.

With this object in view, the invention consists in a construction and combination of parts of which a preferred embodiment is illustrated in the accompanying drawing but to which embodiment the invention is not to be restricted. Continued use in practice may dictate certain changes or alterations and the right is claimed to make any which fall within the scope of the annexed claims.

Figure 2:
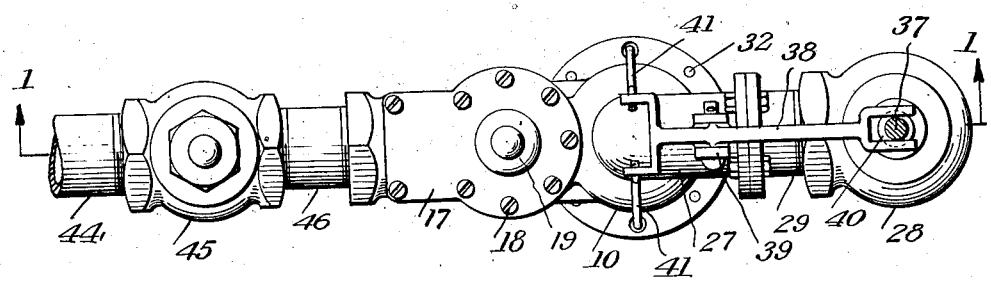

In the drawing:

Figure 1 is a sectional view on the plane indicated by the line 1—1 of Figure 2.

Figure 3:
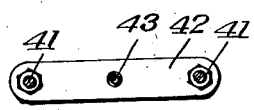

Figures 2 and 3 are sectional views on the planes indicated by the lines 2—2 and 3—3 respectively of Figure 1.

The essential element of the invention comprises a case 10 in which is housed a check valve, a drain valve and a yoke valve, the case being formed interiorly with the webs 11 and 12 which divide the case into chambers 14 and 15, the web 12 being formed with an opening by means of which communication is effected between the chambers 15 and 14, this opening being bounded with a valve seat with which the check valve 16 is normally engaged. The case 10 is open on the top but closed with a removable cover 17 secured in place by means of the screws 18, the cover being formed with an upstanding stepped extension, the smaller upper part 19 of which serves as a guide for the stem 20 at the lower end of which the check valve 16 is carried. The check valve is spring-pressed, as indicated at 21, towards its seat, the spring being disposed in surrounding relation to the stem and bearing one end against an abutment carried by the latter and the other end against the shouldered or enlarged portion of the extension of the cover.

The drain valve 23 is movable toward and away from the seat formed on the upper end of a bushing 24 which is threaded into the case 10 on the under side and acts as a drain port for the chamber 14. The valve 23 has its stem slidably mounted in a guide 25 formed as an extension of the web 12 and the upper end of the stem is operatively connected with the resistance arm of a lever 26 which is fulcrumed on an extension of the web 11, the force arm of said lever being forked to straddle the valve stem 20 below the abutment against which the lower end of the spring 21 engages. When the check valve 16 is engaged with its seat, the drain or bleeding valve 23 is disengaged from its seat on the nipple 24 and when the latter valve is engaged with its seat, the check valve 16 is disengaged from its seat.

The case 10 is formed with an angular tubular leg 27 by means of which it may be placed in communication with a manual control valve 28, the latter being of the form of the conventional globe valve and a flanged nipple 29 connecting its discharge opening with the leg 27 of the case 10.

A valve 30 is disposed in the chamber 15 of the case 10, this valve being designed to seat upon or be raised from an annular flanged member 31 which is secured in an opening in the under side of the case 10 by means of cap screws 32 which pass through its flange. The annular member 31 is formed with a yoke 33 with which is incorporated a guide 34 for the stem 35 of the valve 30, a compression spring 36 being disposed in surrounding relation to the stem and to the guide and bearing one end against the under face of the guide and the other end against the yoke. The spring functions to normally raise the valve from its seat on the annular member.

The yoke valve 30 is operatively connected with the stem 37 of the globe valve by reason of a lever 38 which is rockingly mounted in the bracket 39 formed on the top side of the leg 27, the force arm of the lever 38 being forked to straddle the stem 37 between the spaced collars 40. The resistance arm of the lever 38 is branched to provide arms terminally connected with links 41 which pass slidably through guide eyes or openings formed in the flange of the annular member 31 and the attendant flanged portion of the case 10, the lower extremities of the links connecting with the crosshead 42 with which the yoke valve stem 35 is operatively connected by means of a pilot 43 which slidably engages a centrally disposed opening in the crosshead.

When the globe valve 28 is open, the stem 27 is elevated, so that the resistance arm of the lever 38 is depressed, lowering the links 41 and with them the crosshead 42 and in this position of the globe valve, the yoke valve may be depressed into engagement with its seat on the annular member 31 against the pressure of the spring or, when there is no pressure above the valve, elevated from its seat by the action of the spring.

In installation, the case 10 is connected with the service line 44 through a conventional check valve 45 which has a nipple connection 46 with the case 10 in communication with the chamber 14 of the latter.

In operation, if the globe valve 28 which connects with the water main by means of a pipe 47 is open, water may flow to the service line through the several elements comprised in the invention, the water passing first into the angular leg 27 where it will impact upon and apply a pressure to the yoke valve 30, thus forcing the latter onto its seat, the continued pressure maintaining seat engagement of the valve. But the water pressure will also raise the check valve 16 from its seat against the pressure of the spring 21, at the same time seating the valve 23 and will thus reach the service line 44 by opening the check valve 45. As long as the usual conditions obtain in the system, the several parts will occupy these positions, but should the water main be shut off which would result in reducing pressure in the latter with consequent siphonic action on the water in the service line which would tend to carry such water back into the water main, the improved valve will function to prevent this, since the reduction of pressure in the main will result in the relief of pressure on the yoke valve 30 and it will be raised from its seat on the annular member 31, thus permitting water to be drained out of the chamber 15. At the same time, the check valve 45 will close, preventing the return of any water from the service line into the service valve, but what water is trapped in the nipple 46 and chamber 47 will be discharged through the bleed nipple 24, for the valve 23 will be raised from its seat when the check valve 16 is moved onto its seat, as will be the case on the decline of pressure in the chamber 15. If the check valve 45 leaks, there will still be no return of water to the main for it will be discharged through the bleed nipple 24 by the opening movement imparted to the valve 23 when the check valve 16 seats. The only possible water that might be returned to the main through suction would be that trapped in the leg 27 which, however, would not be contaminated. The invention functions in the same way in the event of a tendency to back-flow even when the main is under pressure but called upon to meet a heavy demand from service lines or affected from pressure pumping systems on the consumers' side of said main.

When the globe valve 28 is closed, it shuts off connection between the main line and the service line and all water trapped in the valve structure is discharged, for with the closing of the globe valve, the rock lever 38 functions to raise the crosshead 42 through the instrumentality of the links 41, when the crosshead engages the shoulder formed at the junction of the stem 35 with its pilot 43, so that the yoke valve is unseated and water discharged from the chamber 15, thus leaving the check valve 16 free to close, so that it may raise the drain valve 23 to permit discharge of water trapped in the chamber 14 and in the nipple 46 and communicating side of the check valve 45.

The invention having been described, what is claimed as new and useful is:

1. A valve structure for the purpose indicated comprising a case interiorly divided into two chambers, a valve controlling communication between one chamber and the atmosphere and yieldingly impelled to open position, a bleed valve controlling communication between the other chamber and the atmosphere and yieldingly impelled to closed position, and a check valve controlling communication between the two chambers and operatively connected with the bleed valve to open the latter when the check valve is in closed position, the check valve being pressure actuated to open position and the first said valve being pressure actuated to closed position, the case being provided with a water inlet leg of which the inner end is axially aligned with and disposed directly above the first said valve.

2. A valve structure for the purpose indicated comprising a case interiorly divided into two chambers, a valve controlling communication between one chamber and the atmosphere and yieldingly impelled to open position, a bleed valve controlling communication between the other chamber and the atmosphere and yieldingly impelled to closed position, a check valve controlling communication between the two chambers and operatively connected with the bleed valve to open the latter when the check valve is in closed position, the check valve being pressure actuated to open position and the first said valve being pressure actuated to closed position, the case being provided with a water inlet leg, and a manual valve for controlling communication between a water main and said inlet leg and operatively connected with the first said valve to positively disengage it from its seat when the manual valve is closed.

3. A valve structure for the purpose indicated comprising a case interiorly divided into two chambers, a valve controlling communication between one chamber and the atmosphere and yieldingly impelled to open position, a bleed valve controlling communication between the other chamber and the atmosphere and yieldingly impelled to closed position, a check valve controlling communication between the two chambers and operatively connected with the bleed valve to open the latter when the check valve is in closed position, the check valve being pressure actuated to open position and the first said valve being pressure actuated to closed position, the case being provided with a water inlet leg, a manual valve controlling communication between said inlet leg and a connected water main, a lever fulcrumed on said inlet leg and having its force arm connected with the manual valve, the first said valve and stem formed with a terminal pilot, links terminally connected with the resistance arm of said lever, and a cross-head carried at the opposite extremities of said links and formed with an opening in which the pilot of the stem of the first said valve has a sliding engagement.

4. A valve structure for the purpose indicated comprising a case, a valve controlling communication between the interior of the case and the atmosphere and yieldingly impelled to open position but pressure actuated to closed position, the case being provided with a water inlet leg of which the inner end is axially aligned with and disposed directly above said valve, and a manual valve for controlling communication between a water main and said inlet leg and operatively connected with the first said valve to positively disengage it from its seat when said manual valve is closed.

ORIEN K. ENTRIKEN.